United States Patent
Zhang et al.

(10) Patent No.: US 7,644,276 B2
(45) Date of Patent: Jan. 5, 2010

(54) METHOD FOR VERIFYING A SECURE ASSOCIATION BETWEEN DEVICES

(75) Inventors: Kan Zhang, Palo Alto, CA (US); Timothy P. J. G. Kindberg, Bristol (GB); Seunghyun Im, Charlotte, NC (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 904 days.

(21) Appl. No.: 10/911,349

(22) Filed: Aug. 3, 2004

(65) Prior Publication Data
US 2006/0031675 A1    Feb. 9, 2006

(51) Int. Cl.
*H04L 9/00* (2006.01)
(52) U.S. Cl. .................. 713/169; 713/170; 713/151
(58) Field of Classification Search ............... 713/168, 713/151, 170
See application file for complete search history.

(56) References Cited

U.S. PATENT DOCUMENTS

| | | | |
|---|---|---|---|
| 6,269,445 B1 * | 7/2001 | Nishioka et al. | 713/168 |
| 6,681,017 B1 * | 1/2004 | Matias et al. | 380/277 |
| 7,093,126 B1 * | 8/2006 | Jutla | 713/168 |
| 2003/0229526 A1 * | 12/2003 | Gallacci et al. | 705/7 |
| 2006/0174116 A1 * | 8/2006 | Balfanz et al. | 713/168 |
| 2007/0113073 A1 * | 5/2007 | Maillard et al. | 713/156 |

* cited by examiner

*Primary Examiner*—Nasser G Moazzami
*Assistant Examiner*—Fikremariam Yalew

(57) ABSTRACT

In a first aspect the present invention provides a method for verifying that a secure association has been formed between a first device and a second device. The method includes, enabling a user of the first device to select a verification indicator, and encrypting the verification indicator using an encryption key of the first device to form cipher text. The cipher text is then communication to the second device using a multi-part communication protocol, and decrypted using an encryption key of the second device to obtain a received verification indicator. The method includes verifying the association is secure if the received verification indicator is the same as the selected verification indicator.

21 Claims, 3 Drawing Sheets

METHOD FOR VERIFYING A SECURE ASSOCIATION BETWEEN DEVICES

FIELD OF THE INVENTION

The present invention relates generally to communication devices and more particularly to a method for verifying that a secure association has been made between at least two devices.

BACKGROUND OF THE INVENTION

One of the goals of modern computing is to provide people with ubiquitous computing environments. In these computing environments it will be necessary to allow devices to become spontaneously associated and interoperable with other devices.

An association can be said to have been made between two (or more) devices when each device possesses data (e.g. another device's network address) that allows the devices to communicate with each other. An association is considered to be secure if a secret encryption key is established and known only to the associated devices.

Due to the ad-hoc nature of such spontaneous associations the connection between devices will generally take place over wireless communication links. However, in some situations wired connections, or combinations of wires and wireless connections will also be used to make spontaneous associations between devices.

The creation of spontaneous associations of this type raises security concerns for users of the devices. In the first instance there is the need for suitable key-exchange protocols to establish secure associations between devices. However even if a key-exchange protocol has been run it is difficult, if not impossible, for the user(s) of the associated devices to verify that the key-exchange protocol has run successfully and that the association is truly secure.

SUMMARY OF THE INVENTION

In a first aspect the present invention provides a method for verifying that a secure association has been formed between a first device and a second device. The method includes, enabling a user of the first device to select a verification indicator, and encrypting the verification indicator using an encryption key of the first device to form cipher text. The cipher text is then communication to the second device using a multi-part communication protocol, and decrypted using an encryption key of the second device to obtain a received verification indicator. The method includes verifying the association is secure if the received verification indicator is the same as the selected verification indicator.

BRIEF DESCRIPTION OF THE DRAWINGS

Embodiments of the present invention will now be described by way of non-limiting example only, with reference to the accompanying drawings, in which.

DETAILED DESCRIPTION OF THE EMBODIMENTS

Figure 1:
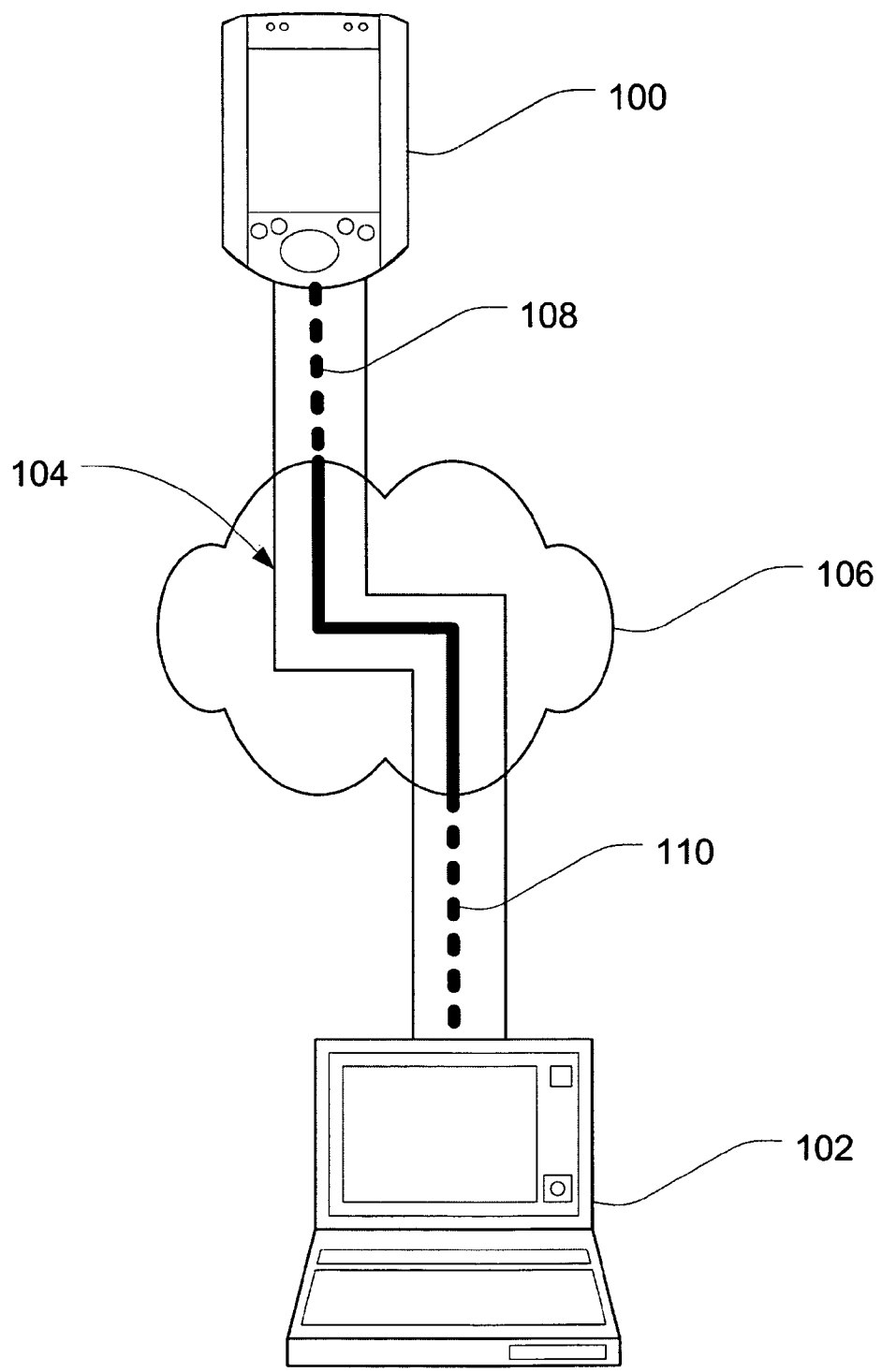
FIG. 1 shows a schematic representation of an association formed between two devices in accordance with an embodiment of the present invention.

FIG. 1 shows a schematic diagram representing an association that has been formed between two devices for which a protocol according to an embodiment of the present invention can be used to verify the security of the association. FIG. 1 shows two computer devices, namely a personal digital assistant (PDA) 100 and a notebook computer 102 which have formed an association 104 with each other.

In the present example, the PDA 100 and the notebook computer 102 are connected to a communications network 106 via wireless communications links 108 and 110 respectively. As will be appreciated by those skilled in the art the association between the devices 100 and 102 may alternatively be formed by a direct wireless or wired communications link or via any combination of wired and wireless computer networks. The wireless links 108 and 110 may operate according to any known wireless standard, including but not limited to the IEEE 802.11 or Bluetooth.

In an embodiment, the encryption of the communications link can be implemented using a key exchange protocol, such as Diffie-Hellman. A key exchange protocol of this type ensures that a man-in-the-middle is unable to use the key exchange protocol to set up the same secret key with the two different parties. Accordingly it is possible to detect a man-in-the-middle attack of this nature by transmitting an encrypted verification indicator between parties using a multi-part communication protocol.

A multi-part communication protocol is a protocol in which an encrypted message can be sent in a piecemeal manner and in which the act of sending the first part of the message effectively commits the sender to the form of the final message. In a multi-part communication protocol the form of the final message should not be able to be computed without each of the pieces of the transmitted message.

If the decryption of the verification indicator fails or the decrypted verification indicator is incorrect there is the possibility that there is a man-in-the-middle.

Figure 2:
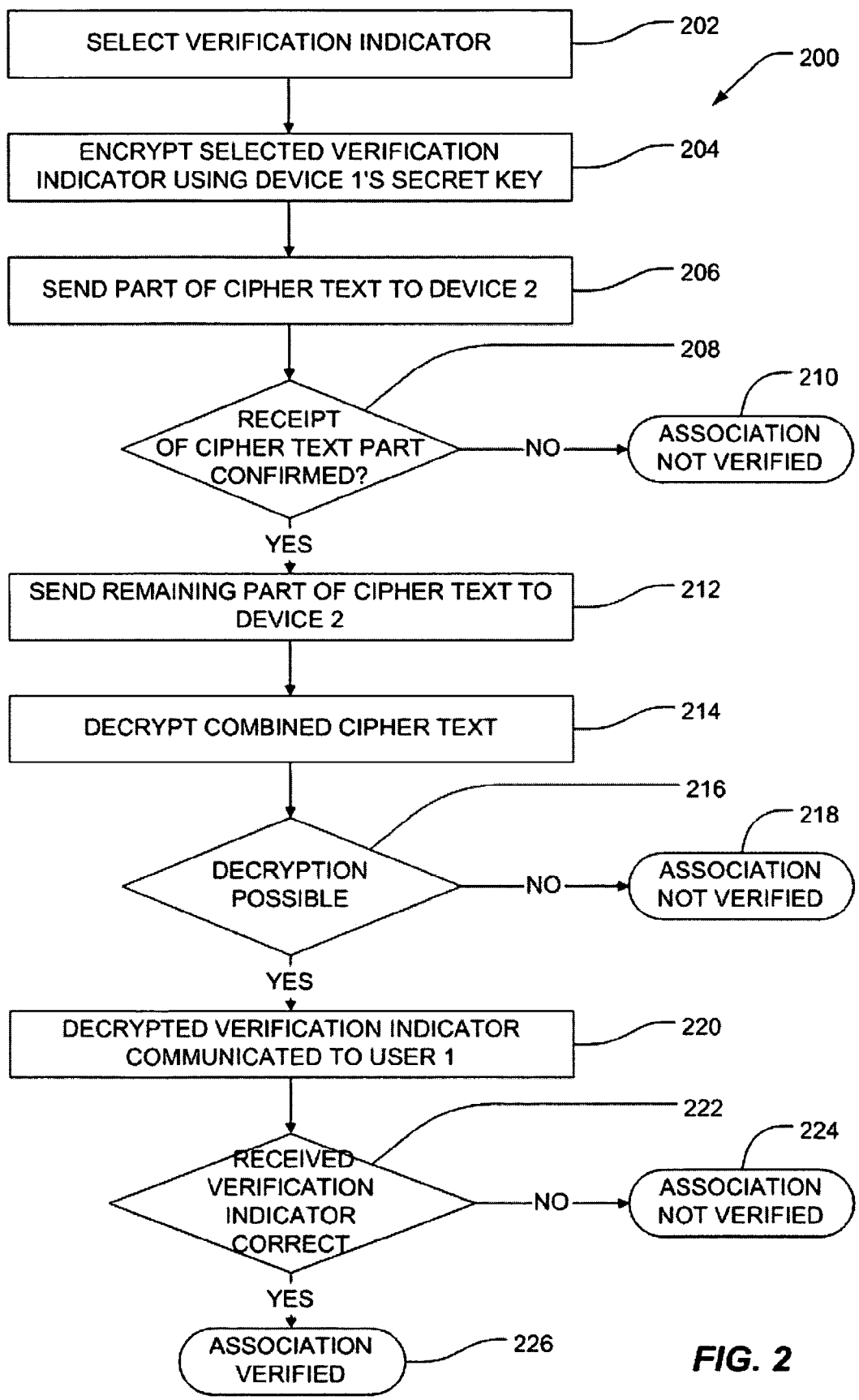
FIG. 2 shows a flow chart depicting the steps in a method for verifying that a secure association has been made between two devices in accordance with an embodiment of the present invention.

FIG. 2 shows a flow chart depicting a process 200 for verifying that the key exchange protocol has been executed properly.

In an initial step 202 the user of a first device, e.g. PDA 100 selects a verification indicator to be used in the protocol. The verification indicator will be used in subsequent steps of the protocol to determine whether the second device, e.g. notebook computer 102, is using the same encryption key as the first device.

In an embodiment, the verification indicator can be a pre-defined gesture, selected from a list of N pre-defined gestures which can be performed by the user of the second device to signal to the user of the first device. The pre-defined gestures may include actions such as "raise your right hand" or "touch your nose" or other such simple human movements.

Alternatively the user of the first device can be left to choose any verification indicator that he/she desires rather than selecting one from a list. For example, the verification indicator may be a word, phrase, or alphanumeric password chosen by the user of the first device. The verification indicator may take various other forms, including but not limited to: sounds, sequences of sounds or tune, or one or more shapes, pictures or glyphs. Graphical patterns may also serve as suitable verification indicators.

In the next step 204 the first device encrypts the chosen verification indicator using the first device's secret key, $K_1$.

In the next step 206 a portion of the cipher text generated in step 204 is transmitted to the second device. Upon receipt of the first portion of the cipher text the second device or a user of the second device indicates to the user of the first device that the first portion of the cipher text has been received. This notification to the user of the first device may take the form of a predetermined acknowledgment gesture such as the raising of the user's right hand. Alternatively, the user of the second device may be required to make a telephone call, or the like, to the user of the first device to indicate that he or she has received the first part of the cipher text. If the second device can be fitted with a publicly viewable display unit or other device capable of communicating with the first device in a manner independent of the association being verified, the display (or other communication means) can be used to communicate an acknowledgment message to the user of the first device that the first part of the cipher text has been received. An automated acknowledgement process of this type is particularly suited for use by a public device such as a printer which doesn't have a designated user.

In step 208 the user of the first device awaits confirmation from the (user of the) second device that the first part of the cipher text has been received. If acknowledgment of receipt of the first part of the cipher text is not received in step 208 the user of the first device aborts the protocol at 210 and the security of the association is not verified. Failure of the user of the second device to acknowledge the receipt of the first half of the cipher text is assumed to indicate that a man-in-the-middle has intercepted the first half of the cipher text, or that no association exists between the devices.

If, in step 208, acknowledgment of receipt of the first half of the cipher text is received by the user of the first device, the user instructs the first device to send the second part of the cipher text to the second device in step 212.

Once the two parts of the cipher text have been received at the second device, it can decrypt the combined cipher text in step 214 using its own secret key, $K_2$.

In the next step 216 a determination is made by the second device whether the decryption has succeeded or failed. If the decryption has failed e.g. the decrypted text cannot possibly represent a verification indicator, the protocol is aborted at 218 on the basis that there is a possibility that a man-in-the-middle has attempted to decipher or tamper with one or both of the two halves of the cipher text message prior to receipt of them by the second device. In this case the security of the association is not verified.

If the decryption operates correctly in step 216 the user of the decrypted verification indicator is communicated to the user of the first device in step 220. If the chosen verification indicator is in the form of a hand gesture or the like the user of the second device can communicate it to the user of the first device by simply making the gesture in such a way that it can be viewed by the user of the first device. If the verification indicator is in the form of a password or code, a telephone call or other communication channel can be established between the users of the first and second devices to allow the user of the second device to communicate the verification indicator to the user of the first device.

In an alternate embodiment if the second device is a public device or device without a user, the second device can be caused to display (or otherwise communicate) the decrypted verification indicator in such a way that it is perceptible to the user of the first device in order to allow him or her to compare the decrypted verification indicator to the verification indicator chosen in step 202 of the method. For example, if the verification indicator is a tune the second device can play the tune so that it can be heard by the user of the first device. If the verification is a string of binary digits an indicator light on the second device, that is visible to the user of the first device, can be caused to blink in accordance with the bit of string to communicate it to the user.

Next in step 222, the user of the first device checks whether the communicated verification indicator is the same as that chosen in step 202. If the wrong verification indicator is communicated to the user of the first device, the security of the association is not verified at 224, on the basis that such an error should only occur if some form of man-in-the-middle attack has been attempted on the association. This type of verification failure is indicative of a situation where a man-in-the-middle has unsuccessfully attempted to guess the verification indicator.

If at any stage of the protocol the second device detects a failure e.g. the combined cipher text is not able to be decrypted, and the second device is a public device without a user, as described above, the device can display or otherwise communicate e.g. play a sound or a message notifying the user of the first device of the failure.

If in step 222 the user of the first device receives the correct verification indicator the user(s) can be confident that there has been no man-in-the-middle attack and the security of the association is verified. In an embodiment, the received correct verification indicator is the same as that chosen in step 202.

When the verification is successful the probability that $K_1$ is not equal to $K_2$, and that the users of the first and second devices have been fooled by a man-in-the-middle, is 1/N, wherein N is the number of possible verification indicators available to be chosen by the user of the first device in step 202. Using the protocol as described above, the only way that the man-in-the-middle can cheat the system is to successfully guess the verification indicator which will be selected by the user of the first device and be in a position to exchange it in accordance with the protocol with the second device.

The probability of such an attack being mounted successfully can be made arbitrarily small by running the protocol multiple times. As will be appreciated by those skilled in the art after running the protocol m times the probability that a man-in-the-middle attack has successfully guessed the chosen verification indicator m times becomes N-m. Thus the users of the first device and second device can run the protocol as many times as they wish until they are both convinced that there is not a man-in-the-middle.

It should be noted that instead of transmitting two parts of the cipher text in steps 206 and 212 as described above, other two-part encryption methods as noted in Ronald Rivest & Adi Shamir, "How to Expose an Eavesdropper", Communications of the ACM, Vol. 27, no. 4 April 1984 may be used. As noted above such two-part methods can be used as long as the transmission of the first part of the message effectively commits the sender to the form of the final text, although the form of the final text cannot be computed without the use of the second half of the cipher text. For example, the first half of the cipher text could be a one-way hash of the cipher text and the second half may be the cipher text itself.

Figure 3:
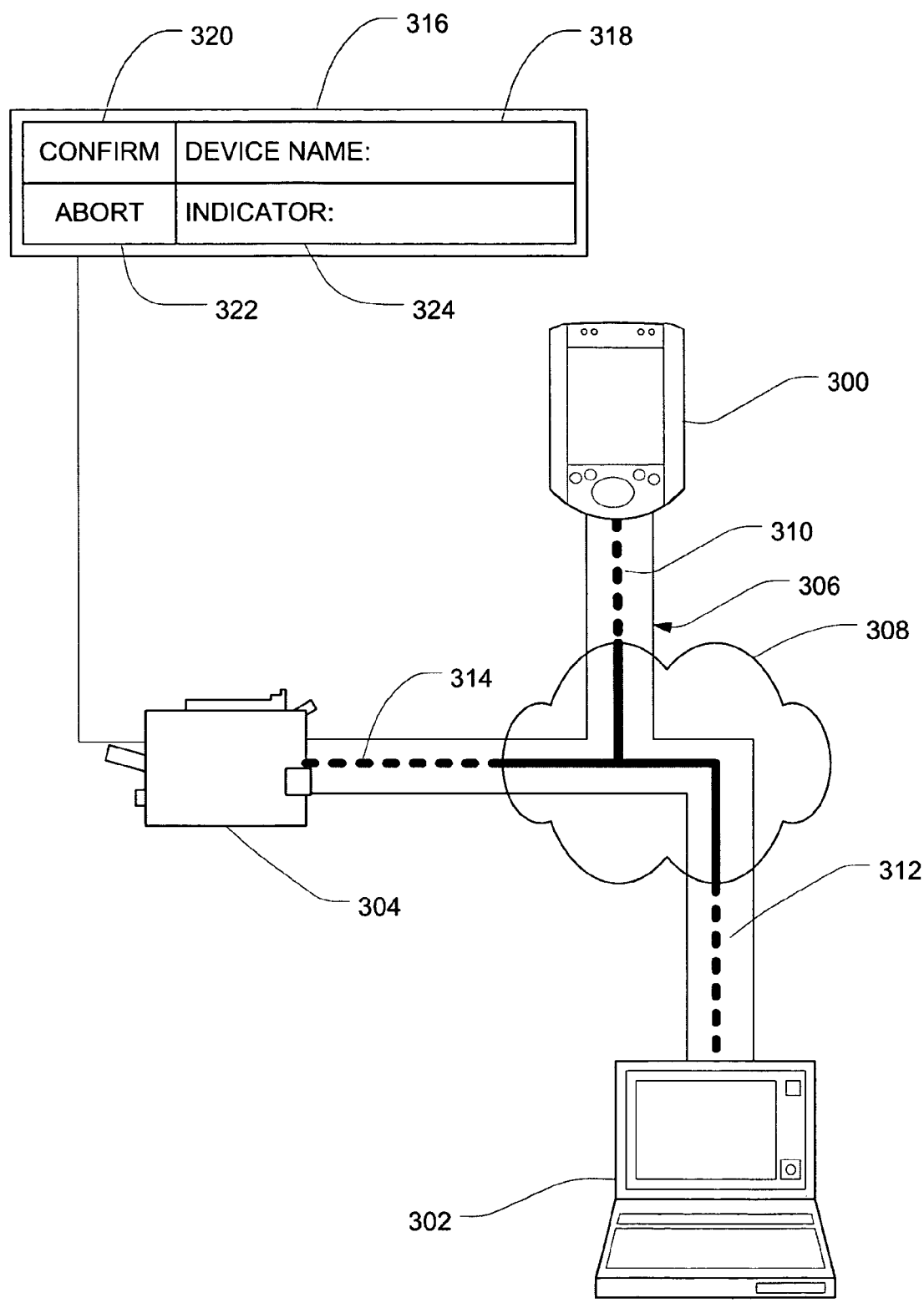
FIG. 3 shows a schematic diagram showing the situation in which three devices have become spontaneously associated with each other in accordance with an embodiment of the present invention.

FIG. 3 shows a schematic diagram showing the situation in which three devices have become spontaneously associated with each other. In this scenario the devices are a PDA 300, a notebook computer 302 and a printer 304. The association 306 enables communication between all three devices 300, 302 and 304. Each of the devices 300, 302 and 304 are connected to a communications network 308 via respective wireless communications links 310, 312 and 314.

The printer 304 is also connected to a publicly viewable display 316 that can be used to display messages to the users of the PDA 300 and notebook computer 302. The display 316 is configured to be able to display in window 318 the name (or other identifier) of the device with which it is currently associated. In window 320, the display can show a message notifying the user of an associated device that the printer 304 has received the first half of the cipher text in step 208. Window 322 is provided to allow the printer to display an "abort" message to the user. This can occur if decryption fails in step 216 and step 218 of the method is reached.

The display 316 is also configured to allow the printer to display, in window 324, a representation of the decrypted verification indicator.

Thus the verification of the security of an association with the printer 304 can be made without the presence of a user at the device.

As described in connection with FIG. 1 the wireless links 310, 312 and 314 may operate according to any known wireless standard, including but not limited to IEEE 802.11 or Bluetooth.

The creation of a spontaneous association with three (or more) devices is similar to the situation with two devices. Once the key exchange protocol has been run the verification process can be executed. A key exchange protocol can be used that generates a group key, or generates pair-wise keys for each pair of devices in the association. In either case the verification method is run repeatedly and independently to verify that the association between each possible pair of devices is secure.

When a group key exchange protocol is used to set up session keys for a plurality of devices, and verification of the security of a communications link between any pair of devices fails the group key-exchange protocol is compromised and the session is insecure. Securing the association then requires that the key exchange protocol is run again. When a pair-wise key exchange protocol is used, failure of the verification the security of a link between one pair of devices only requires that the key-exchange protocol be repeated between that pair of devices to attempt to establish secure communications.

As mentioned above, the method can be run repeatedly to reduce the chance of the users being fooled by a man-in-the-middle. In an alternative embodiment, the method can be run twice in an interlocking manner between a pair of devices. In this scenario the user of each device performs steps 202 to 208. Rather than awaiting confirmation from the user of the other device that its cipher text has been received, each device sends the second part of its cipher text once it has received the first half of the cipher text of the other device.

If the first cipher text message of either device is not received at the other device, verification will fail since the second half of one device's cipher text will never be sent.

If both devices receive the first cipher text message they each continue through steps 212 to 226 of the method as previously described.

It will be understood that the invention disclosed and defined herein extends to all alternative combinations of two or more of the individual features mentioned or evident from the text or drawings. All of these different combinations constitute various alternative aspects of the invention.

The foregoing describes embodiments of the present invention and modifications, obvious to those skilled in the art can be made thereto, without departing from the scope of the present invention.

The invention claimed is:

1. A method for verifying that a secure association has been formed between a first device and a second device the method including:
  enabling a user of the first device to select a verification indicator;
  encrypting the verification indicator using an encryption key of the first device to form cipher text;
  communicating the cipher text to the second device using a multi-part communication protocol;
  decrypting the cipher text using an encryption key of the second device to obtain a received verification indicator; and
  verifying the association is secure if the received verification indicator is the same as the selected verification indicator;
  wherein communicating the cipher text to the second device using a multi-part communication protocol, includes:
    communicating a first part of the cipher text to the second device; and
    communicating a second part of the cipher text to the second device, upon receipt, by the user of the first device, of confirmation that the first part of the cipher text has been received at the second device.

2. The method of claim 1 in which the verification indicator includes at least one humanly perceptible indicator of a type selected from one of the following types of indicators:
  a gesture; a human movement, a visual image, a sound, a series of sounds, a password, a number, an alphanumeric code, a shape, a glyph, a pattern, a color.

3. The method of claim 2 in which the verification indicator is selected from a multiplicity of predefined verification indicators.

4. The method of claim 3 in which the received verification indicator is communicated to the user of the first device by a user of the second device.

5. The method of claim 4 in which the user of the second device performs a predefined action to confirm that the first part of the cipher text has been received at the second device.

6. The method of claim 4 in which the user of the second device performs a second action to communicate the received verification indicator to the user of the first device.

7. The method of claim 6 in which the association is not verified as being secure if at least one of the following occurs:
  confirmation that the first part of the cipher text has been received at the second device is not received at the first device;
  the second device cannot decrypt the cipher text to obtain the received verification indicator;
  the received verification indicator is not the same as the selected verification indicator.

8. A method of forming a verified secure associated between a first device and a second device, including:
  forming an association between the first device and the second device;
  securing the association using a key exchange protocol to generate and distribute a secret encryption key to each of the first and second devices, and
  verifying that the association is secure by:
  enabling a user of the first device to select a verification indicator, wherein the verification indicator is selected from a multiplicity of predefined verification indicators;
  encrypting the verification indicator using an encryption key of the first device to form cipher text;
  communicating multiple portions of the cipher text separately to the second device using a multi-part communication protocol, wherein communicating the cipher text to the second device using a multi-part communication protocol, includes
communicating a first part of the cipher text to the second device; and
communicating a second part of the cipher text to the second device, upon receipt, by the user of the first device, of confirmation that the first part of the cipher text has been received at the second device;
using the multiple portions of the cipher text received at the second device to decrypt the cipher text and obtain a received verification indicator; and
verifying the association is secure if the received verification indicator is the same as the selected verification indicator.

9. The method of claim 8 in which the verification indicator includes at least one humanly perceptible indicator selected from one of the following types of indicators:
a gesture; a human movement, a visual image, a sound, a series of sounds, a password, a number, an alphanumeric code, a shape, a glyph. a pattern, a color.

10. The method of claim 8 in which the received verification indicator is communicated to the user of the first device by a user of the second device.

11. A computer network including at least a first computer device and a second computer device, said first computer device being associated with the second computer device by a verified secure association formed by:
forming an unsecured association between the first device and the second device; securing the association using a key exchange protocol to generate and distribute a secret session key to each of the first and second devices, and
verifying that the association is secure by,
enabling a user of the first device to select a verification indicator, wherein the verification indicator is selected from a multiplicity of predefined verification indicators;
encrypting the verification indicator using an session key of the first device to form cipher text;
communicating multiple portions of the cipher text separately to the second device using a multi-part communication protocol, wherein communicating the cipher text to the second device using a multi-part communication protocol includes
communicating a first part of the cipher text to the second device; and
communicating a second part of the cipher text to the second device, upon receipt, by the user of the first device, of confirmation that the first part of the cipher text has been received at the second device;
using the multiple portions of the cipher text received at the second device to decrypt the cipher text and obtain a received verification indicator; and
verifying the association is secure if the received verification indicator is the same as the selected verification indicator.

12. The network of claim 11 wherein the verification indicator includes at least one humanly perceptible indicator selected from one of the following types of indicators:
a gesture; a human movement, a visual image, a sound, a series of sounds, a password, a number, an alphanumeric code, a shape, a glyph. a pattern, a color.

13. The network of claim 11 wherein the received verification indicator is communicated to the user of the first device by a user of the second device.

14. A first computer device having embedded therein a computer program configured to be run on the first computer device, said program being configured to enable the first computer device to form a secure association with a second computer device using a method including:
forming an unsecured association with the second device;
securing the association using a key exchange protocol to establish a shared secret session key with second device, and
verifying that the association is secure by,
enabling a user of the first device to select a verification indicator, wherein the verification indicator is selected from a multiplicity of predefined verification indicators;
encrypting the verification indicator using a secret session key of the first device to form cipher text;
communicating multiple portions of the cipher text separately to the second device using a multi-part communication protocol, wherein communicating the cipher text to the second device using a multi-part communication protocol includes
communicating a first part of the cipher text to the second device; and
communicating a second part of the cipher text to the second device, upon receipt, by the user of the first device, of confirmation that the first part of the cipher text has been received at the second device; and
verifying the association is secure if a deciphered verification indicator received from the second device is the same as the selected verification indicator.

15. A computer network including at least a first computer device and a second computer device, said first computer device being associated with the second computer device via a verified secure association, in which the security of the association was verified by enabling a user of the first device to select a verification indicator;
encrypting the verification indicator using an encryption key of the first device to form cipher text;
communicating the cipher text to the second device using a multi-part communication protocol;
decrypting the cipher text using an encryption key of the second device to obtain a received verification indicator; and
verifying the association is secure if the received verification indicator is the same as the selected verification indicator;
wherein communicating the cipher text to the second device using a multi-part communication protocol, includes:
communicating a first part of the cipher text to the second device; and
communicating a second part of the cipher text to the second device, upon receipt, by the user of the first device, of confirmation that the first part of the cipher text has been received at the second device.

16. The network of claim 15 in which the verification indicator includes at least one humanly perceptible indicator selected from one of the following types of indicators:
a gesture; a human movement, a visual image, a sound, a series of sounds, a password, a number, an alphanumeric code, a shape, a glyph, a pattern, a color.

17. The network of claim 16 in which the verification indicator is selected from a multiplicity of predefined verification indicators.

18. The network of claim 17 in which the received verification indicator is communicated to the user of the first device by a user of the second device.

19. The network of claim 18 in which the user of the second device performs a predefined action to confirm that the first part of the cipher text has been received at the second device.

20. The first computer device of claim 14 in which the association is formed at least in part using a wireless communications link.

21. The first computer device of claim 14 wherein the verification indicator includes at least one humanly perceptible indicator selected from one of the following types of indicators:

a gesture; a human movement, a visual image, a sound, a series of sounds, a password, a number, an alphanumeric code, a shape, a glyph. a pattern, a color.

* * * * *

UNITED STATES PATENT AND TRADEMARK OFFICE
CERTIFICATE OF CORRECTION

PATENT NO. : 7,644,276 B2
APPLICATION NO. : 10/911349
DATED : January 5, 2010
INVENTOR(S) : Kan Zhang et al.

Page 1 of 1

It is certified that error appears in the above-identified patent and that said Letters Patent is hereby corrected as shown below:

In column 7, line 21, in Claim 9, delete "glyph." and insert -- glyph, --, therefor.

In column 7, line 62, in Claim 12, delete "glyph." and insert -- glyph, --, therefor.

In column 10, line 5, in Claim 21, delete "glyph." and insert -- glyph, --, therefor.

Signed and Sealed this

Twenty-sixth Day of October, 2010

David J. Kappos
*Director of the United States Patent and Trademark Office*